Gelled unvulcanized latex foam 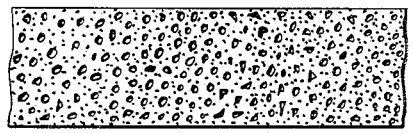
Fig-1
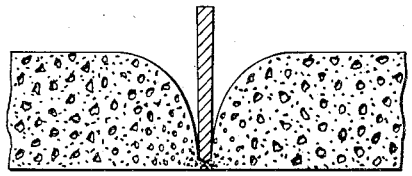 Compressing gelled latex foam
Fig-2
Vulcanizing Gelled latex foam 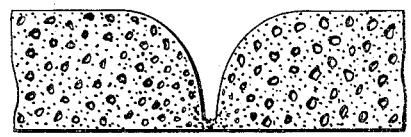
Fig-3
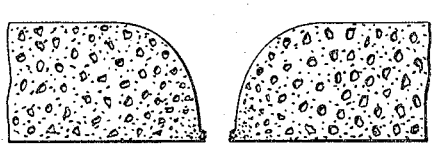 Severed vulcanized sponge articles
Inventors
Alvin R. Cox
Frank E. Trockle
By Robert W. Furlong
Atty Patented Nov. 13, 1951

2,575,259

UNITED STATES PATENT OFFICE 2,575,259

METHOD OF MAKING FOAMED SPONGE RUBBER ARTICLES

Alvon R. Cox, Cuyahoga Falls, and Frank E. Trockle, Akron, Ohio, assignors to The B. F. Goodrich Company, New York, N. Y., a corporation of New York Application November 17, 1948, Serial No. 60,622

8 Claims. (Cl. 18—53)

This invention relates to a method of making foamed sponge rubber articles, and is particularly concerned with a method of forming foamed latex sponge whereby the finished article has a rounded, essentially closed edge analogous to a molded sponge rubber article.

Sponge rubber articles are commonly prepared by foaming an unvulcanized vulcanizable rubber latex either by whipping air or other gas into such latex, or by dispersing a gas generating material in the latex and causing a gas to be liberated to yield a cellular foamed structure, which is thereafter gelled by means of any of the well-known gelling agents and finally vulcanized.

It is often advantageous to use foamed latex in making sponge rubber articles, particularly those articles which are sheet-like in form, since the latex can be foamed continuously and poured out in a layer of suitable thickness which can be gelled and vulcanized and thereafter cut to the desired shape and size. This method suffers from several disadvantages, however. Cutting the vulcanized foamed sponge rubber results in a raw edge in which the cellular structure is exposed with no smooth outer skin to give the article a finished appearance. In the case of articles having any more complicated shape than that of a simple slab or block, it is necessary to pour the latex foam into individual molds in which it is gelled and vulcanized.

It is therefore an object of this invention to provide a method of making rubbery articles from foamed rubber latex whereby the article has a finished rounded edge and to provide a method of forming such an article from a body or layer of foamed latex without the necessity of employing an individual mold.

We have discovered that a method in accordance with the foregoing objects comprises foaming a body of unvulcanized vulcanizable rubber latex containing a gelling agent, heating the foam, then compressing a restricted zone of the foam to collapse the foam structure in that zone. A projection such as a rod when pressed against a body of gelled foam forms a curved depression or dimple in the surface, while a straightedge forms a groove the sides of which are convexly curved toward the straightedge. The curved configuration is permanently retained when the distorting force is removed. By the application of sufficient pressure, the compressed sponge rubber gel may be cut completely through in the same operation if desired.

The gelled latex foam, when it has been thus formed, retains its shape permanently and may readily be vulcanized in this condition by heating in the conventional manner, as for example, in hot air or in open steam or by exposure to a high frequency alternating electrostatic field.

In the appended drawing, which represents various steps of the process,

Fig. 1 is a view in section of a body of gelled, unvulcanized latex foam;

Fig. 2 is a similar view showing the step of compressing a localized zone of said body;

Fig. 3 is a similar view showing said body after removal of the compressing force; and Fig. 4 is a similar view showing the body severed along the zone of compression.

In order to obtain a satisfactory product, it is essential that the latex foam be heated before the above-described forming step is carried out. If this heating step is omitted, the curved partially compressed zone of the latex foam adjacent the zone to which the compressive force has been directly applied tends to crack and split during vulcanization. However, if the latex foam is heated to a temperature of 140°–220° F. and maintained at that temperature for a period of 1 to 5 minutes before it is compressed, such cracking and splitting is eliminated. Best results are obtained by maintaining the latex foam at a temperature of 140°–210° F. for 1 to 3 minutes. Such a heating step, we have found, does not prevent successful forming of the gelled foam; the foam has no "elastic memory" even after this heating step and it retains the desired configuration permanently after the subsequent forming step.

The reason why the heating step overcomes the tendency of the edge to crack without materially increasing the elastic memory of the gelled latex foam is not fully understood, and it is not intended to limit this invention by any theories which might be offered by way of explanation. It has been found, however, that the time and temperature of heating are critical.

The particular vulcanizable rubber latex which is employed is not critical and any of the well-known aqueous dispersions of polymeric organic rubbery materials may be used, whether crude (i. e. naturally occurring latices such as caoutchouc or the like) or synthetic. Thus, the latices which may be used include any of the latices of any sulfur-vulcanizable rubbed material such as caoutchouc and similar naturally occurring crude rubbers as well as such synthetic rubbers as the rubbery polymers of butadiene, chloroprene, isoprene and similar ethylenic monomeric materials as well as copolymers of these and similar materials with such well-known copolymerizable monomeric materials as acrylonitrile, methacrylonitrile, styrene, methyl acrylate, ethyl acrylate, methyl methacrylate, ethyl methacrylate, 2-vinyl pyridine and the like.

The latex may, of course, contain any of the well-known compounding ingredients commonly employed in latex compounding such as vulcanizing agents and accelerators therefor, antioxidants, fillers, reinforcing agents, stabilizers, emulsifiers, etc. with the amounts and proportions thereof in accordance with conventional latex compounding techniques. The particular compositions which may be used are well-known in the art and form no part of this invention.

The latex may be foamed by any of the well-known methods therefor, one of the most commonly employed methods being to whip air or other gas into the latex until a relatively stable cellular foam structure is obtained.

This foam may then be dried but is preferably gelled by the addition thereto of a suitable amount of any well-known gelling agent. Thus, before or after the latex has been foamed, a gelling agent such as sodium silicofluoride may be mixed therein in amounts of 0.01–1.0% based on the total weight of the foam. The amount of such gelling agent may be varied in accordance with common practices but usually amounts to not more than 10% and usually not more than 5% of the weight of the latex with amounts of 0.01% to 2.0% being commonly employed.

The resulting gelled foam is relatively stable but can be readily compressed to collapse the foam structure and has no elastic memory so that the compressed portion remains in the compressed condition after the external collapsing force is removed. In this condition, however, the areas adjacent the compressed portion tend to crack badly upon vulcanization.

It is necessary, therefore, that the gelled foam be heated in accordance with this invention before any portion of the foam is compressed. For optimum results, the foam is heated to a temperature of 140°–210° F. and maintained at such temperature for 1 to 3 minutes. The total heating time required will, of course, vary depending upon the method used for heating the foam, and the gel formation may take place during the heating step.

The foam may be heated in an air oven at 175° F. for example, in which case it may require from 2 to 12 minutes for the foam to attain a uniform temperature throughout its extent of about 170°–175° F. In the preferred embodiment, the foam is heated by means of high frequency alternating electrostatic energy in a manner well known to the art, whereby the foam is rapidly and uniformly heated to the desired temperature. Using such high frequency heating, the entire heating operation will take but 1–3 minutes since the temperature rise is almost instantaneous. The particular source and intensity of high frequency energy is a matter of choice but best results have been obtained using a current frequency of from 6 to 40 megacycles per second with optimum results at about 15 megacycles.

The invention may be illustrated by means of a specific example which is included merely by way of illustration and which is not intended to limit the scope of the invention.

*Example*

In making sponge pads, a typical unvulcanized crude rubber latex composition is provided, as follows:

| Material | Parts by Weight |
|---|---|
| Caoutchouc latex (60% rubber solids) | 100.0 |
| Zinc Oxide | 1.0 |
| Sulfur | 1.0 |
| Zinc dibutyl dithiocarbamate | 1.0 |
| Casein | 0.35 |
| Ammonium oleate | 0.5 |
| Total | 103.85 |

The ammonium oleate is included to act as a foaming agent and may be replaced by saponin or any other well-known foaming aid.

To this latex composition is added 0.1 part by weight of sodium silicofluoride, and the latex is thereafter immediately whipped into foam. The foam is poured on a metal sheet in a layer about one inch thick. This layer of foam is thereafter subjected to a high frequency field having a frequency of 15 megacycles per second for a period of 2 minutes whereby the foam is heated at about 180° F. to produce a body of gelled latex foam as shown in Fig. 1.

A strap metal die of the shape of the pad desired is pressed down edgewise on the layer of gelled foam, compressing the foam along a relatively narrow zone to a thickness of about 1/8" to 1/4" as shown in Fig. 2. The die is removed from the foam, which retains its compressed condition as shown in Fig. 3.

The gelled foam is thereupon vulcanized by heating it at 250° F. for 10 minutes. The resulting vulcanized layer of foamed sponge rubber is thereafter cut through the compressed non-cellular portion resulting in a sponge rubber pad having closed edges as shown in Fig. 4.

Any of the well-known vulcanizable latices may be used and any desired sponge rubber article which can be formed by die cutting can be prepared, and it will be understood that the method set forth in detail may be varied or modified within the spirit and scope of the invention as defined in the appended claims.

We claim:

1. The method of shaping a body of a gelled vulcanizable rubber latex foam which comprises maintaining said body at a temperature of 140°–220° F. for a period of 1 to 5 minutes, applying compressive force to a localized zone of said body to collapse at least partially the foam structure in said zone, removing said compressive force, and thereafter vulcanizing said body with said zone in said collapsed condition and free from confinement.

2. The method of shaping a body of a gelled vulcanizable rubber latex foam which comprises maintaining said body at a temperature of 140°–220° F. for a period of 1 to 5 minutes, applying compressive force to a localized zone of said body to collapse the foam structure in said zone completely and permanently, removing said compressive force, and thereafter vulcanizing said body in open heat with said zone in the collapsed condition.

3. The method of shaping a body of a gelled vulcanizable rubber latex foam which comprises heating said body at a temperature of 140°–210° F. for a period of 1 to 3 minutes, applying compressive force to a localized zone of said body to form a depression in the surface of said body having outwardly convex walls, removing said compressive force, and thereafter vulcanizing said body having said depression therein free from confinement.

4. The method of shaping a body of a gelled vulcanizable rubber latex foam which comprises heating said body at a temperature of 140°–210° F. for a period of 1 to 3 minutes, applying compressive force along a narrow localized zone of said body to form a valley having outwardly convex sidewalls by permanently collapsing at least a portion of the foam structure in said zone, removing said compressive force, and thereafter vulcanizing said body with said zone free from confinement.

5. The method of forming foamed sponge rubber articles which comprises providing a body of a foamed vulcanizable rubber latex containing a gelling agent, heating said body to a temperature of 140° to 220° F., maintaining said body at said temperature for a period of one to five minutes to produce a body of gelled latex foam, compressing a localized zone of said gelled latex foam to collapse permanently the foam structure in said zone, releasing said zone from compressive force, vulcanizing said body in open heat, and thereafter cutting said body through said compressed zone.

6. The method of cutting foamed sponge rubber which comprises foaming a body of a vulcanizable rubber latex, gelling and heating the foam at a temperature of 140°–210° F., maintaining said body at said temperature for 1–3 minutes, exerting external pressure on a relatively narrow zone of the gelled foamed latex to compress the foam and collapse the foam structure in said zone, releasing said pressure, vulcanizing said body with said zone free from confinement, and thereafter cutting said body through said compressed zone.

7. The method of making a foamed sponge rubber article, which method comprises foaming a body of a vulcanizable rubber latex, subjecting the foam to high frequency alternating electrostatic energy for 1 to 3 minutes to gel and heat the foam to 140°–210° F., pressing an outline die of the configuration of the desired article on said body of foamed latex to compress the foam in a narrow zone under the die and collapse the foam structure in said zone, removing the die, vulcanizing said body with said zone free from confinement and thereafter cutting said body through said compressed zone.

8. The method of making a foamed sponge rubber article, which method comprises foaming a body of a vulcanizable rubber latex, gelling and heating the foam at a temperature of 140°–210° F., maintaining said body at said temperature for 1–3 minutes, applying external pressure to a relatively narrow zone of the gelled foamed latex to compress and collapse the foam structure in said zone and to sever adjacent portions of said body along said zone, releasing said pressure, and vulcanizing the severed body in open heat.

ALVON R. COX.
FRANK E. TROCKLE.

REFERENCES CITED

The following references are of record in the file of this patent:

UNITED STATES PATENTS

| Number | Name | Date |
|---|---|---|
| 2,071,647 | Miller | Feb. 23, 1937 |
| 2,150,178 | Maywald | Mar. 14, 1939 |
| 2,161,308 | Murphy | June 6, 1939 |
| 2,200,262 | Daley | May 14, 1940 |
| 2,216,785 | Roberts | Oct. 8, 1940 |
| 2,271,058 | Binns | Jan. 27, 1942 |